US009773044B2

(12) United States Patent
Dubbels et al.

(10) Patent No.: US 9,773,044 B2
(45) Date of Patent: *Sep. 26, 2017

(54) MULTI-DIMENSIONAL FEATURE MERGING FOR SUPPORTING EVIDENCE IN A QUESTION AND ANSWERING SYSTEM

(71) Applicant: International Business Machines Corporation, Armonk, NY (US)

(72) Inventors: Joel C. Dubbels, Eyota, MN (US); Thomas J. Eggebraaten, Rochester, MN (US); Mark G. Megerian, Rochester, MN (US); William C. Rapp, Rochester, MN (US); Richard J. Stevens, Monkton, VT (US); Patrick M. Wildt, Morgan, MN (US); Eric W. Will, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 598 days.

This patent is subject to a terminal disclaimer.

(21) Appl. No.: 13/793,287

(22) Filed: Mar. 11, 2013

(65) Prior Publication Data
US 2014/0172879 A1 Jun. 19, 2014

Related U.S. Application Data

(63) Continuation of application No. 13/716,579, filed on Dec. 17, 2012.

(51) Int. Cl.
G06F 15/18 (2006.01)
G06F 17/30 (2006.01)

(52) U.S. Cl.
CPC .... *G06F 17/3053* (2013.01); *G06F 17/30654* (2013.01)

(58) Field of Classification Search
None
See application file for complete search history.

(56) References Cited

U.S. PATENT DOCUMENTS

| 5,321,833 A | 6/1994 | Chang et al. |
| 6,366,903 B1 | 4/2002 | Agrawal et al. |
| 7,146,361 B2 | 12/2006 | Broder et al. |

(Continued)

OTHER PUBLICATIONS

Ingo Glockner—University of Hagen at CLEF 2008 Answer Validation Exercise.*

(Continued)

*Primary Examiner* — Kakali Chaki
*Assistant Examiner* — Viker Lamardo
(74) *Attorney, Agent, or Firm* — Patterson+Sheridan, LLP

(57) ABSTRACT

Method, system, and computer program product to analyze a plurality of candidate answers identified as responsive to a question presented to a deep question answering system, by computing a first feature score for a first feature of an item of evidence, of a plurality of items of evidence, the first feature score being based on at least one attribute of the first feature, the item of evidence relating to a first candidate answer, of the plurality of candidate answers, and computing a merged feature score for the first candidate answer by applying the first feature score to a second feature score for a second feature of the item of evidence.

10 Claims, 4 Drawing Sheets

(56) References Cited

U.S. PATENT DOCUMENTS

| | | | |
|---|---|---|---|
| 7,437,382 B2 | 10/2008 | Zhang et al. | |
| 7,966,305 B2* | 6/2011 | Olsen | G06F 17/30864 707/706 |
| 8,346,701 B2* | 1/2013 | Wang | G06F 17/30634 706/46 |
| 2006/0026152 A1 | 2/2006 | Zeng et al. | |
| 2008/0167891 A1* | 7/2008 | Cohn | G06Q 30/02 705/1.1 |
| 2008/0235208 A1 | 9/2008 | Rouhani-Kalleh | |
| 2009/0287578 A1 | 11/2009 | Paluszek et al. | |
| 2009/0287678 A1* | 11/2009 | Brown | G06F 17/30654 |
| 2009/0299766 A1 | 12/2009 | Friedlander et al. | |
| 2010/0191686 A1* | 7/2010 | Wang | G06F 17/30634 706/46 |
| 2012/0077178 A1* | 3/2012 | Bagchi | G09B 7/00 434/362 |
| 2012/0078891 A1* | 3/2012 | Brown | G06F 17/30654 707/723 |
| 2012/0084293 A1* | 4/2012 | Brown | A61B 5/00 707/741 |
| 2012/0089622 A1* | 4/2012 | Fan | G06F 17/30675 707/749 |
| 2012/0171648 A1* | 7/2012 | Price | G09B 19/00 434/219 |
| 2012/0303559 A1* | 11/2012 | Dolan | G06N 99/005 706/12 |
| 2014/0172755 A1 | 6/2014 | Dubbels et al. | |

OTHER PUBLICATIONS

Li et al.—Learning Question Classifiers.*
U.S. Appl. No. 13/716,579, entitled Multi-Dimensional Feature Merging for Supporting Evidence in Question and Answering System, filed Dec. 17, 2012.
Li et al. "Learning Question Classifiers" 2002, http://dl.acm.org/citation.dfm?id=1072378, 7 pages.
Ackerman, et al., "Answer Garden 2: Merging Organizational Memory with Collaborative Help", retrieved on Jul. 14, 2016 at <<http://www.eecs.umich.edu/~ackerm/pub/96b22/cscw96.ag2.pdf>>, ACM Conference on Computer-Supported Cooperative Work, CSCW, 1996, 11 pages.
Agichtein, et al., "Finding High-Quality Content in Social Media", retrieved on Jul. 14, 2016 at <<http://www.mathcs.emory.edu/~eugene/papers/wsdm2008quality.pdf>>, WSDM 2008, Feb. 11-12, 2008, Palo Alto, California, 2008, 11 pages.
Berger, et al., "Bridging the Lexical Chasm: Statistical Approaches to Answer-Finding", Proceedings of the 23rd annual international ACM SIGIR conference on Research and development in information retrieval, Athens, Greece, 2000, pp. 192-199.
Berger, et al., "Information Retrieval as Statistical Translation", retrieved on Jul. 14, 2016 at <http://www.informedia.cs.cmu.edu/documents/irast-final.pdf>, SIGIR 1999, Aug. 1999, Berkeley, California, ACM, 1999, 8 pages.
Bian, et al., "A Few Bad Votes Too Many? Towards Robust Ranking in Social Media", retrieved on Jul. 14, 2016 at <<http://www.mathcs.emory.edu/~eugene/papers/airweb2008_spam.pdf>>, AIRWeb 2008, Apr. 22, 2008, Beijing, China, 2008, 8 pages.
Bian, et al., "Finding the Right Facts in the Crowd: Factoid Question Answering over Social Media", retrieved on Jul. 14, 2016 at <<http://wwwconference.org/www2008/papers/pdf/p467-bianA.pdf, WWW 2008, Apr. 21-25, 2008, Beijing, China, pp. 467-476.
Bilotti, et al., "Structured Retrieval for Question Answering", retrieved on Jul. 14, 2016 at <<http://www.cs.cmu.edu/~mbilotti/pubs/Bilotti:SIGIR07.pdf>>, SIGIR 2007, Jul. 23-27, 2007, Amsterdam, The Netherlands, 2007, pp. 351-358.
Blei, et al., "Modeling Annotated Data", retrieved on Jul. 14, 2016 at <<http://www.cs.columbia.edu/~blei/papers/BleiJordan2003.pdf>>, Proceedings of the 26th annual international ACM SIGIR conference on Research and development in information retrieval, 2003, Toronto, Canada, 8 pages.
Blooma, et al., "A Predictive Framework for Retrieving the Best Answer", SAC 2008, Mar. 16-20, 2008, Fortaleza, Ceara, Brazil, 2008, (abstract only).
Blooma, et al., "Towards a Hierarchical Framework for Predicting the Best Answer in a Question Answering System", retrieved on Jul. 14, 2016 at <<http://www.springerlink.com/content/3815g4153n414160/fulltext.pdf>>, ICADL 2007, LNCS 4822, Springer-Verlag Berlin Heidelberg, 2007, pp. 497-498 (abstract only).
Brill, et al., "Data-Intensive Question Answering", retrieved on Jul. 14, 2016 at <http://research.microsoft.com/~sdumais/Trec2001Notebook.Feb2002Final.pdf>, 8 pages.
Chu-Carroll, et al., "In Question Answering, Two Heads Are Better Than One", Proceedings of HLT-NAACL 2003, Edmonton, May-Jun. 2003, pp. 24-31.
Dumais, et al. "Web Question Answering: Is More Always Better?", SIGIR 2002, Aug. 11-15, 2002, Tampere, Finland, 2002, 9 pages.
French, "The Computational Modeling of Analogy-making", retrieved on Jul. 14, 2016 at <http://lead.u-bourgogne.fr/people/french/analogy.tics.pdf>, 12 pages.
Getoor, et al., "Learning Probabilistic Relational Models", 2001, pp. 7-35.
Getoor, et al., "Learning Probabilistic Models of Link Structure", retrieved on Jul. 14, 2016 at <<http://www.seas.upenn.edu/~taskar/pubs/jmlr02.pdf>>, 2002, pp. 679-707.
Ghahramani, et al., "Bayesian Sets", retrieved on Jul. 14, 2016 at <<http://www.gatsby.ucl.ac.uk/~heller/bsets.pdf>>, 8 pages.
Gyongyi, et al., "Questioning Yahoo! Answers", retrieved on Jul. 14, 2016 at <<http://ilpubs.stanford.edu:8090/819/1/2007-35.pdf>>, WWW 2008, Apr. 21-25, 2008, Beijing, China, 10 pages.
Halevy, "Answering Queries Using Views: A Survey", retrieved on Jul. 14, 2016 at <<www.cs.washington.edu/homes/alon/site/files/view-survey.ps>>, pp. 1-36, published in the VLDB Journal 10:270-294 (2001).
Harper, et al., "Predictors of Answer Quality in Online Q&A Sites", CHI 2008, Apr. 5-10, 2008, Florence, Italy, 2008, pp. 865-874 (abstract only).
Hofmann, "Probabilistic Latent Semantic Analysis", UAI 1999 Proceedings of the Fifteenth conference on Uncertainty in Artificial Intelligence, Stockholm, 1999, pp. 289-296.
Ittycheriah, et al., "IBM's Statistical Question Answering System—TREC-11", retrieved on Jul. 14, 2016 at <http://trec.nist.gov/pubs/trec11/papers/ibm.ittycheriah.pdf>, pp. 1-8.
Jeon, "A Framework to Predict the Quality of Answers with Non-Textual Features", retrieved on Jul. 14, 2016 at <http://ciir.cs.umass.edu/pubfiles/ir-469.pdf>, SIGIR 2006, Aug. 6-10, 2006, Seattle, Washington, 2006, 8 pages.
Jijkoun, et al., "The University of Amsterdam at CLEF@QA 2006", retrieved on Jul. 14, 2016 at <http://ifarm.nl/erikt/papers/clef2006.pdf>, 13 pages.
Jeon, et al. "Finding Similar Questions in Large Question and Answer Archives", retrieved on Jul. 14, 2016 at <http://ciir.cs.umass.edu/pubfiles/ir-442.pdf>, CIKM 2005, Oct. 31-Nov. 5, 2005, Bremen, Germany, 2005, 7 pages.
Jurczyk, et al., "Discovering Authorities in Question Answer Communities by using Link Analysis", retrieved on Jul. 14, 2016 at <http://www.mathcs.emory.edu/~eugene/papers/cikm2007-AnswersAuthorities.pdf>, CIKM 2007, Nov. 6-8, 2007, Lisboa, Portugal, 2007, 4 pages.
Kleinberg, "Authoritative Sources in a Hyperlinked Environment", retrieved on Jul. 15, 2016 at <https://www.cs.cornell.edu/home/kleinber/auth.pdf>, Journal of the ACM, vol. 46, No. 5, Sep. 1999, 34 pages.
Ko, et al., "A Probabilistic Framework for Answer Selection in Question Answering", retrieved on Jul. 15, 2016 at <http://www.cs.cmu.edu/~jko/paper/HLT07.pdf>, 8 pages.
"Latent Dirichlet Allocation", retrieved from Wayback Machine on Jul. 15, 2016 at <http://web.archive.org/web/20081004065341/http://en.wikipedia.org/wiki/Latent_Dirichlet_Allocation>, Wikipedia, Aug. 31, 2008, pp. 1-3.
Ko, et al., "A Probabilistic Graphical Model for Joint Answer Ranking in Question Answering", retrieved on Jul. 15, 2016 at

(56) References Cited

OTHER PUBLICATIONS

<https://www.cs.purdue.edu/homes/lsi/Sigir07_ko_si_nyberg.pdf>, SIGIR 2007, Jul. 23-27, 2007, Amsterdam, The Netherlands, 2007, 8 pages.

Leibenluft, "A Librarian's Worst Nightmare: Yahoo! Answers, where 120 million users can be wrong", retrieved on Jul. 15, 2016 at <<http://www.slate.com/id/2179393/>>, Slate, Dec. 7, 2007, 2 pages.

Li, et al., "Answer Extraction Based on System Similarity Model and Stratified Sampling Logistic Regression in Rare Date", retrieved on Jul. 15, 2016 at <http://paper.ijcsns.org/07_book/200603/200603A27.pdf>, IJCSNS International Journal of Computer Science and Network Security, vol. 6, No. 3, Mar. 2006, pp. 1-8.

Lin, et al., "Question Answering from the Web Using Knowledge Annotation and Knowledge Mining Techniques", retrieved on Jul. 15, 2016 at <http://start.csail.mit.edu/publications/Lin+Katz-cikm-2003.pdf>, CIKM'03, Nov. 3-8, 2003, New Orleans, Louisiana, 2003, pp. 116-123.

Magnini, et al., "Is It the Right Answer? Exploiting Web Redundancy for Answer Validation", retrieved on Jul. 15, 2016 at <http://www.aclweb.org/anthology/P02-1054>, Proceedings of the 40th Annual Meeting of the Association for computational Linguistics (ACL), Philadelphia, Jul. 2002, pp. 425-432.

Molla, et al. "Question Answering in Restricted Domains: An Overview", retrieved on Jul. 15, 2016 at <http://www.mitpressjournals.org/doi/pdfplus/10.1162/coli.2007.33.1.41>, MIT Press Journals, vol. 33, No. 1, Mar. 2007, 24 pages.

Nyberg, et al., "Extending the Javelin QA System with Domain Semantics", retrieved on Jul. 15, 2016 at <http://www.cs.cmu.edu/~vasco/pub/Nyberg05.pdf>, American Association for Artificial Intelligence (AAAI), 2005, 5 pages.

Popescul, et al., "Structural Logistic Regression for Link Analysis", retrieved on Jul. 15, 2016 at <http://repository.upenn.edu/cgi/viewcontent.cgi?article=1139&context=cis_papers>, 2nd Workshop on Multi-Relational Data Mining (MRDM 2003), 17 pages.

Silva, et al., "Analogical Reasoning with Relational Bayesian Sets", retrieved on Jul. 15, 2016 at <http://mlg.eng.cam.ac.uk/zoubin/papers/analogy-aistats2007.pdf>, 8 pages.

Soricut, et al., "Automatic Question Answering Using the Web: Beyond the Factoid", retrieved on Jul. 15, 2016 at <http://www.radusoricut.com/pubs/soricut-brill-jir2006.pdf>, Journal of Information Retrieval, Kluwer Academic Publishers, 2006, 15 pages.

Su, et al., "Internet-Scale Collection of Human-Reviewed Data", retrieved on Jul. 15, 2016 at <http://infolab.stanford.edu/~qi/internet_scale_collection_of_human_reviewed_data_www07.pdf>, WWW 2007, May 8-12, 2007, Banff, Alberta, Canada, 2007, 10 pages.

"The Long Tail: Why the Future of Business is Selling Less of More", retrieved from Wayback Machine on Jul. 15, 2016 at <http://web.archive.org/web/20081201111508/http://en.wikipedia.org/wiki/Long_Tail>, Wikipedia, Nov. 28, 2008, 8 pages.

Zhang, et al., "Expertise Networks in Online Communities: Structure and Algorithms", retrieved on Jul. 15, 2016 at <<http://www2007.org/papers/paper516.pdf>>, WWW 2007, May 8-12, 2007, Banff, Alberta, Canada, 2007, pp. 221-230.

Shen, et al., "Data Mining and Case-Based Reasoning for Distance Learning", retrieved on Jul. 15, 2016 at <https://www.semanticscholar.org/paper/Data-Mining-and-Case-Based-Reasoning-for-Distance-Shen-Han/5360235efce9001c0ec3a3307dee76f05387cfbd/pdf>, Journal of Distance Education Technologies, 1(3), 46-58, Jul.-Sep. 2003.

* cited by examiner

MULTI-DIMENSIONAL FEATURE MERGING FOR SUPPORTING EVIDENCE IN A QUESTION AND ANSWERING SYSTEM

CROSS-REFERENCE TO RELATED APPLICATIONS

This application is a continuation of co-pending U.S. patent application Ser. No. 13/716,579, filed Dec. 17, 2012. The aforementioned related patent application is herein incorporated by reference in its entirety.

BACKGROUND

Embodiments disclosed herein relate to computer software which implements multi-dimensional feature merging for supporting evidence in a deep question answering system.

SUMMARY

Embodiments disclosed herein provide a system, method, and computer program product to perform an operation to analyze a plurality of candidate answers identified as responsive to a question presented to a deep question answering system, by computing a first feature score for a first feature of an item of evidence, of a plurality of items of evidence, the first feature score being based on at least one attribute of the first feature, the item of evidence relating to a first candidate answer, of the plurality of candidate answers, and computing a merged feature score for the first candidate answer by applying the first feature score to a second feature score for a second feature of the item of evidence.

DETAILED DESCRIPTION

Figure 1:
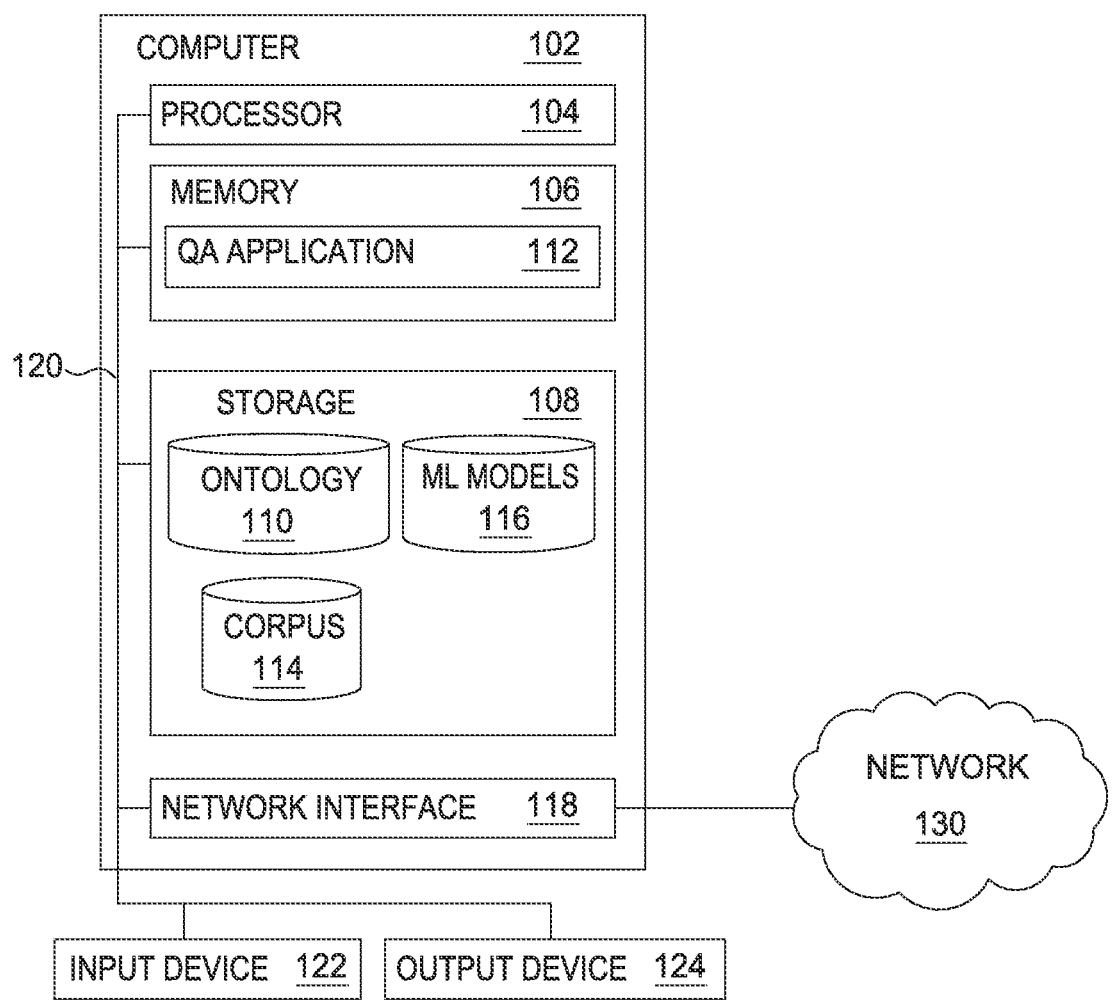
FIG. 1 is a block diagram illustrating a system for multi-dimensional feature merging for supporting evidence in deep question answering systems, according to one embodiment disclosed herein.

When a user provides a case (or question) to a deep question answering (deep QA) system, the deep QA system must rank candidate answers in such a way that the correct candidate answer (or answers) are ranked higher than incorrect candidate answers to a high degree of confidence. A set of features (or attributes) of the candidate answers, such as risk factors, preferred treatments, or patient preferences may be identified. The features may also be attributes of items of supporting evidence analyzed by the deep QA system in scoring candidate answers, such as evidence sentiment. Each feature may itself have a set of attributes, such as age of data and sample size for a quality feature that considers the quality of the candidate answers and items of supporting evidence. Embodiments disclosed herein provide a deep QA system which merges evidence features by aggregating a set of features for a piece of evidence into a single score, then uses that score to either weight or filter other evidence features as they are merged into a single set for a candidate answer.

In a use case such as oncology, where a case presented to the deep QA system requires a more complex answer than a simple fact-based question, there is often not a single obvious correct answer, and conflicting evidence is prevalent. If the question asks for a recommended treatment for a patient, the evidence may provide opinions or recommendations rather than state a correct answer. In the oncology use case, relevant features of the supporting evidence may include, but are not limited to, quality, relevance, and overall sentiment. The quality features may reflect the quality of the evidence, independent of any question it supports. The attributes of evidence quality may focus on different attributes of medical studies, including the use of the blinding technique, randomization methods, number of participants in the study, and participant dropout percentage. Evidence relevance features represent how relevant the supporting evidence is to the specific case or patient that is being processed. Attributes of evidence relevance may include the number of words or concepts in the case (or patient context) that are also mentioned in the evidence, or whether a specific concept is aligned with the evidence. For example, if the case centers on a patient who is HER2 positive, and the evidence is about a study on patients who are HER2 negative, the evidence would not be relevant. Finally, evidence sentiment features indicate whether the treatment option was determined to be favorable or unfavorable. In oncology, this may include a statement in the study indicating, for example, that "Patients with early-stage breast cancer who are HER2 positive that took this drug had a decreased rate of recurrence." Other factors may include disease-free survival, overall survival, quality of life, risk of side effects, and the like.

Ultimately, the deep QA system may generate a score for each candidate answer in order to rank the candidate answers to select the most correct response. However, simply averaging each of the feature scores in doing so may not be sufficient. For example, for a given treatment option, evidence may be found which shows a decreased of risk of recurrence from a high quality study, but not very relevant to the presented case. Additionally, evidence of increased risk of recurrence from a very relevant study may be found from a very untrustworthy source. Therefore, embodiments disclosed herein may compute a feature score for each defined feature, and use one or more of the feature scores to influence other feature scores in generating the overall score for the candidate answer. For example, in the oncology use case, the quality and relevance feature scores may be used to filter and weight the sentiment feature score, which may then be used in generating the score for the candidate answer. For example, if a particular piece of evidence does not meet a quality or relevance threshold, the sentiment features may be disregarded and not used when scoring the candidate answer. As another example, evidence quality and relevance scores may be used to weight the sentiment features as they are merged such that higher quality or more relevant evidence contributes more to the feature score being used to score the candidate answer than lower quality or less relevant evidence.

The oncology use case is discussed herein for illustrative purposes only. It should be understood that a deep QA system used in the oncology context is but one embodiment, and that embodiments disclosed herein may apply equally to many applications of a deep QA system. The oncology use case should not be considered limiting of the disclosure in any way.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a deep question answering system or related data available in the cloud. For example, the deep question answering system could execute on a computing system in the cloud and implement multi-dimensional feature merging for supporting evidence. In such a case, the deep question answering system could apply feature merging for supporting evidence and store the results at a storage location in the cloud. Doing so allows a user to access this information from any computing system attached to a network connected to the cloud (e.g., the Internet).

FIG. 1 is a block diagram illustrating a system 100 for multi-dimensional feature merging for supporting evidence in deep question answering systems, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which will then provide an answer to the case based on an analysis of a corpus of information. The QA application 112 may analyze the questions presented in the case to identify a number of candidate answers. The QA application 112 may then find supporting evidence for the candidate answers. The QA application 112 may then score and rank the candidate answers, merge the results, and present the best answer as its response to the case.

The QA application 112 may score the supporting evidence, and use these scores to score the candidate answers. The QA application 112 may merge features of the supporting evidence into a single score per item of evidence, also referred to as feature aggregation. For example, in an oncology use case, all evidence quality features would be aggregated into a single quality score for each piece of evidence. Any number of techniques may be used to compute these scores, including a weighted sum of feature values, or using a machine learning model to calculate a score based on training data. Once the features have been aggregated, the QA application 112 may merge the evidence features across all items of evidence for a candidate answer into a single set of features for the candidate answer. For example, in the oncology use case, the QA application 112 may use the aggregated feature scores for quality and relevance to generate a single set of sentiment features (i.e., one each for rate of recurrence, disease-free survival, quality of life, risk of side effects, etc.). The QA application may use any number of methods to merge the evidence features, including, but not limited to, a filter threshold, weighted merging, or a combination of both. A filter threshold may eliminate a piece of evidence during merging if it does not meet a certain threshold. For example, the QA application 112 may be configured to calculate the average rate of recurrence across all evidence, but excludes any evidence having a quality score falling below a predefined quality threshold. Weighted merging may involve using aggregated features as a weight factor when merging other features. For example, when merging and calculating the overall survival sentiment feature, the QA application 112 may use the highest feature value across all evidence, but may apply more weight to evidence that has a higher relevance score. Therefore, in one embodiment, the QA application 112 may multiply the survival score by the relevance score to produce a weighted survival score. In embodiments where a less complex case is presented to the QA application 112, feature aggregation may not be necessary, as a single feature of the evidence may be used to merge other evidence features.

As shown, storage 108 contains the ontology 110, which provides a structural framework for organizing information. An ontology formally represents knowledge as a set of concepts within a domain, and the relationships between those concepts. The storage 108 also includes a corpus 114, which is a body of information used by the QA application 112 to generate answers to cases. For example, the corpus 114 may contain scholarly articles, dictionary definitions, medical studies, encyclopedia references, and the like. Additionally, the storage 108 includes machine learning (ML) models 116, which are created by the QA application 112 during a training session. Once the QA application 112 has been trained using training data, the ML models 116 may be used to compute a single feature score for each feature of an item of supporting evidence from the corpus 114. Although depicted as a database, the ontology 110, corpus 114, and ML models 116 may take any form sufficient to store data, including text files, xml data files, and the like. In one embodiment, the ontology 110 is part of the corpus 114. Although depicted as residing on the same computer, any combination of the QA application 112, the ontology 110, corpus 114, and ML models 116 may reside on the same or different computers.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
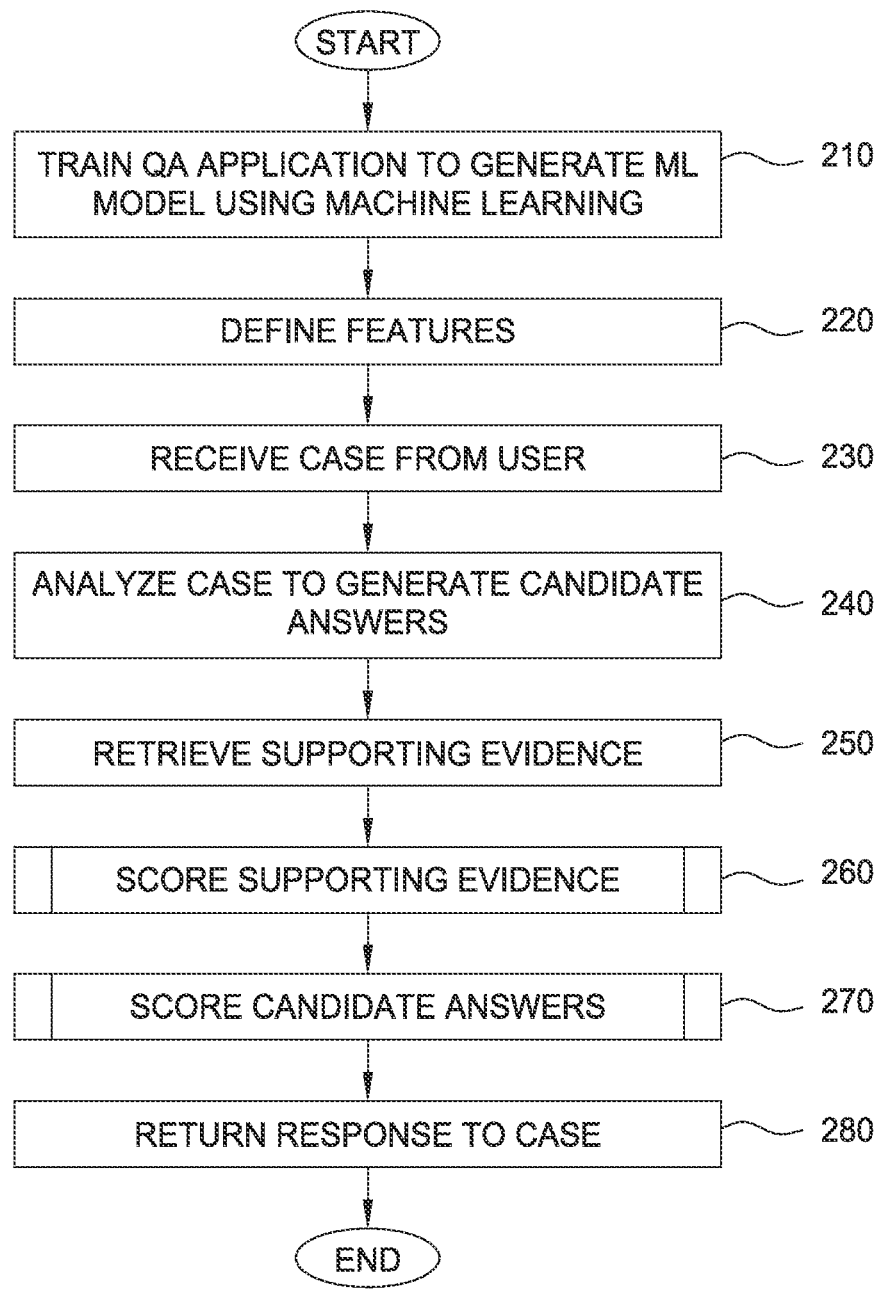
FIG. 2 is a flow chart illustrating a method for multi-dimensional feature merging for supporting evidence in deep question answering systems, according to one embodiment disclosed herein.

FIG. 2 is a flow chart illustrating a method 200 for multi-dimensional feature merging for supporting evidence in deep question answering systems, according to one embodiment disclosed herein. Generally, execution of the method 200 allows a deep QA system, such as the QA application 112, to score supporting evidence and candidate answers by aggregating features in the supporting evidence, then merging the features across all evidence into a single set of features per candidate answer. In one embodiment, the QA application 112 performs the steps of the method 200. At step 210, the QA application 112 may be trained to generate machine learning (ML) models which may be used to compute feature scores for each of a plurality of features of an item of supporting evidence. In training the QA application 112 to generate the ML models, training data is input to the QA application 112. Based on the training data, the QA application 112 generates the ML models for one or more features of the training data. The QA application 112 may then store the generated ML models in the ML models 116. In one embodiment, the QA application 112 may forego the use of ML models to calculate single feature scores for the supporting evidence in lieu of a more direct computation, such as using a weighted sum of feature values. At step 220, the QA application 112, or a user, may define features (or attributes) of the supporting evidence and candidate answers which should be aggregated or merged. For example, in an oncology use case, evidence quality features, evidence relevance features, and evidence sentiment features may be defined as important in the scoring of supporting evidence and candidate answers. The QA application 112, or the user, may then define evidence quality features and evidence relevance features as those features which should be aggregated, whereby a single quality score and a single relevance score for an item of supporting evidence may be generated through the aggregation. The aggregated features (quality and relevance) may then be defined to influence the generation of a set of sentiment scores during the feature merging process. In addition to defining the features, attributes of the features may also be defined at step 220. For example, in the oncology use case, attributes of the sentiment feature may include a rate of recurrence, disease free survival, overall survival, quality of life, risk of side effects, and the like.

At step 230, the QA application 112 may receive a case from a user. The case may be a factual question, such as, "who was the 16$^{th}$ president of the United States?" The case may also be a more complex, detailed scenario, such as a patient's medical information, history, and symptoms, which are provided to the QA application 112 with the expectation that the QA application 112 will provide an accurate diagnosis, recommend appropriate treatments, and the like. At step 240, the QA application 112 may analyze the case to select candidate answers from the corpus 114. At step 250, the QA application 112 retrieves supporting evidence for the candidate answers from the corpus 114. At step 260, described in greater detail with reference to FIG. 3, the QA application 112 may score the supporting evidence, also referred to as evidence feature aggregation. Generally, the step 260 comprises collapsing a set of related evidence features into a single score per evidence. In the oncology use case, this may include taking all evidence quality features (such as study sample size, date of study, randomization method, and the like), and computing a single quality score for each piece of evidence found. In one embodiment, a machine learning model is used to compute the feature scores for each item of evidence. At step 270, described in greater detail with reference to FIG. 4, the QA application 112 may score candidate answers using evidence feature merging. Generally, feature merging utilizes the aggregated features to intelligently merge features across all items of evidence into a single set of features per candidate answer. For example, in the oncology use case, feature merging may result in a single set of sentiment features (such as rate of recurrence, disease-free survival, quality of life, etc.) for each candidate answer. At step 280, the QA application 112 may select a candidate answer as the most correct answer, and return the selected candidate answer as responsive to the case.

Figure 3:
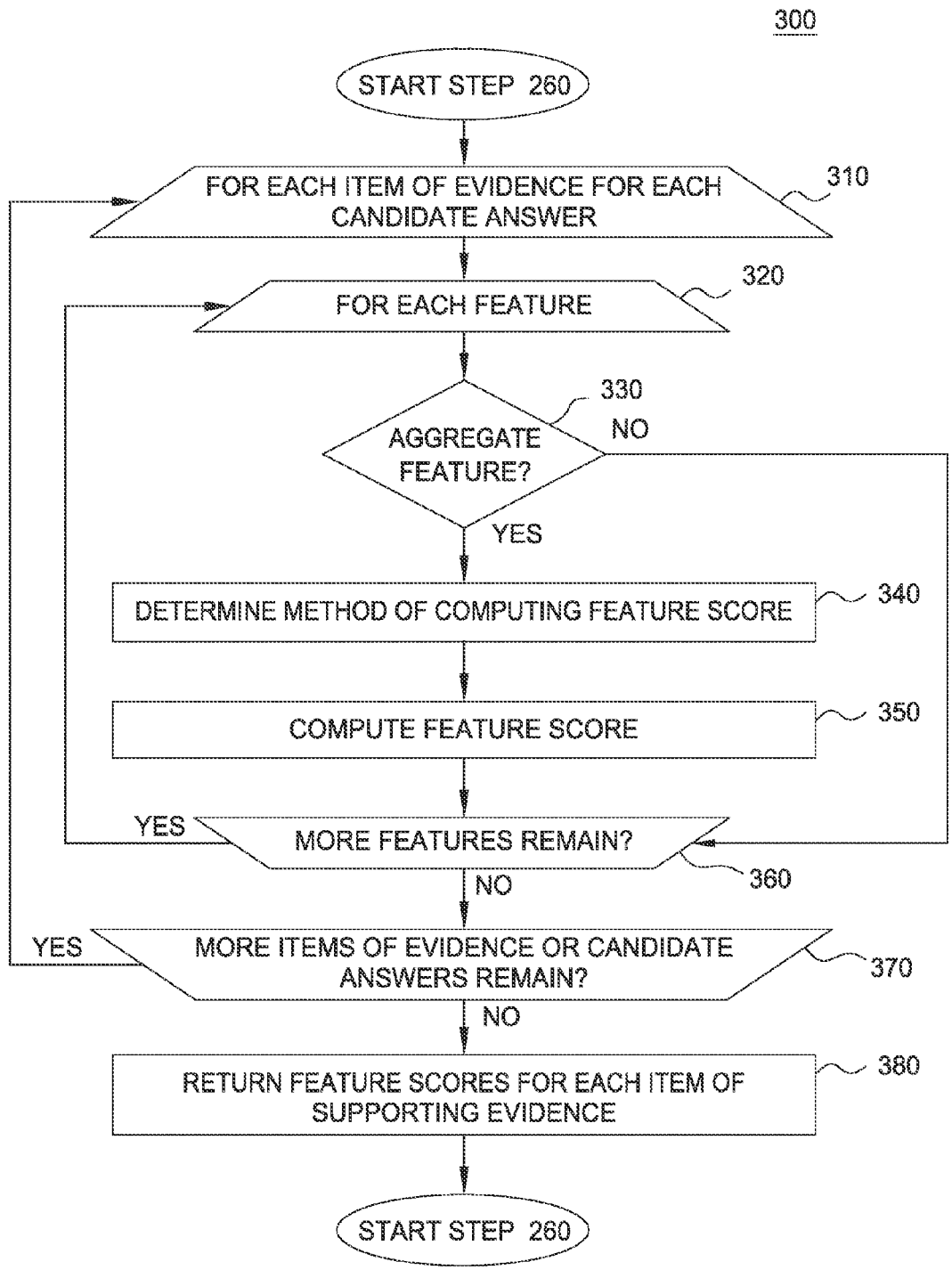
FIG. 3 is a flow chart illustrating a method to compute feature scores for an item of supporting evidence, according to one embodiment disclosed herein.

FIG. 3 is a flow chart illustrating a method 300 corresponding to step 260 to compute feature scores for an item of supporting evidence, according to one embodiment disclosed herein. Generally, the method 300 includes aggregating a set of features for a piece of supporting evidence into a single score. For example, in the oncology use case, all evidence quality attributes, or features, may be aggregated into a single quality score for each item of supporting evidence. Likewise, all evidence relevance attributes may be aggregated into a single relevance score for each item of supporting evidence. In one embodiment, the QA application 112 performs the steps of the method 300. At step 310, the QA application 112 begins executing a loop containing steps 320-370 for each item of supporting evidence for each candidate answer. The candidate answers and items of supporting evidence may have been identified by the QA application 112 at steps 240 and 250, respectively. Each item of supporting evidence for each candidate answer may be analyzed in order to ultimately score each candidate answer. At step 320, the QA application 112 begins executing a loop containing steps 330-360 for each feature of the items of supporting evidence. At step 330, the QA application 112 determines whether the feature should be aggregated. In one embodiment, this determination may have been made by the user, or the QA application 112, at step 220. In some embodiments, the QA application 112, or a user, may determine that a particular feature should not be aggregated, or used in the scoring of supporting evidence and candidate answers. If the feature should be aggregated, the QA application 112 proceeds to step 340. If the feature should not be aggregated, the QA application 112 proceeds to step 360. At step 340, the QA application 112 determines the method of computing a feature score for the feature. In one embodiment, the QA application 112 may use a machine learning (ML) model from the ML models 116 which has been generated by the QA application 112 to score features based on a training case. Alternatively, a mathematical equation may be used to merge features, such as a weighted sum of feature values.

At step 350, the QA application 112 computes the feature score based on the selected method. Regardless of the method used to compute the feature score, the feature score identifies different attributes, or sub-features, of the features, and uses them to compute an overall score for the feature. For example, in the oncology use case, an overall evidence quality score may be computed based on individual scores for attributes of the item of supporting evidence. Since many items of evidence in an oncology case may be a clinical trial, the attributes may include, but are not limited to, use of the blinding technique, randomization method, number of participants in the study, and dropout percentage. Based on these attributes, the QA application 112 may then compute an overall quality score for the quality feature, which indicates a level of quality of the supporting evidence. The quality score may be on any scale sufficient to provide a range of quality values. The QA application 112 may also, in the next iteration of the loop, compute a single relevance score based on predefined relevance attributes, such as a number of matching words or concepts in the question that are also in the evidence, or whether a specific concept is aligned with the evidence. At step 360, the QA application 112 determines whether additional features remain for the current item of supporting evidence and candidate answer. If additional features remain, the QA application 112 returns to step 320. If no additional features remain, the QA application 112 proceeds to step 370, where the QA application 112 determines whether more items of evidence or more candidate answers remain. If more items of evidence or more candidate answers remain, the QA application 112 returns to step 310. Otherwise, each piece of supporting evidence for each candidate answer has been analyzed, and the QA application 112 proceeds to step 380. At step 380, the QA application 112 returns the computed feature scores for each item of supporting evidence.

Figure 4:
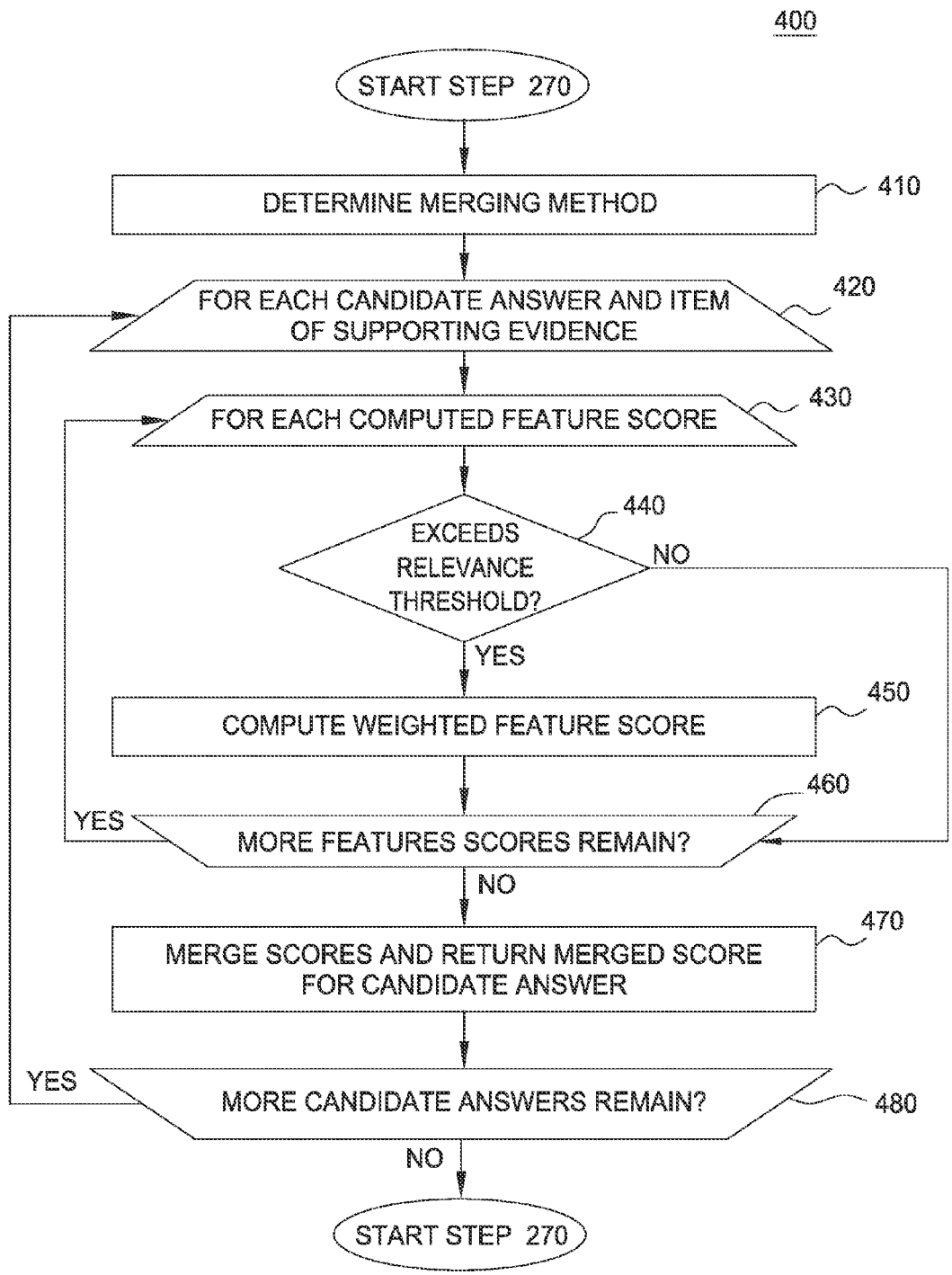
FIG. 4 is a flow chart illustrating a method to compute feature scores for candidate answers, according to one embodiment disclosed herein.

FIG. 4 is a flow chart illustrating a method 400 corresponding to step 270 to compute feature scores for candidate answers, according to one embodiment disclosed herein. Generally, the method 400 is configured to take the feature scores computed at step 260 and use them in computing a set of feature scores for another feature of the items of evidence. Additionally, the method 400 may also compute a feature score for candidate answers based on the feature scores for the items of evidence. For example, in the oncology use case, the evidence relevance and quality scores may be used to filter and/or weight the set of sentiment feature values for each candidate answer. Once generated, the set of sentiment feature values may be used by the QA application 112 to score each candidate answer, and one candidate answer may be selected by the QA application 112 as the correct response to the case. In one embodiment, the QA application 112 executes the steps of the method 400. At step 410, the QA application 112 determines the merging method to be used in merging the single feature scores. For example, a filtering threshold method may eliminate a piece of evidence during merging if it does not meet a predefined threshold. The predefined threshold may be set by a user, or the QA application 112. In the oncology use case, this may include setting a 50% quality threshold, such that supporting evidence not exceeding the 50% quality threshold is not considered. Additionally, a weighted merging method may also be used, where the QA application 112 weights a feature score by the aggregated feature scores. For example, when the QA application 112 merges and calculates an overall survival sentiment feature, the maximum feature value may be desired across all evidence, but more weight may be given to evidence that has a higher relevance score. If evidence A has a high overall survival score, such as 80%, but a poor relevance score of 50%, then evidence A may have a weighted survival score of 40%. Evidence B, however, may have a lower overall survival score at 65%, but since it was very relevant (95%), its weighted score would be 61%. Since the QA application 112 requires the maximum survival score in scoring candidate answers, the 61% weighted score of Evidence B would be the final survival score for that candidate answer. Finally, a combination of filtering and weighting may be used to merge features. For example, a filter threshold of 50% for quality may be used in conjunction with a weighting factor based on the relevance score. For the sake of illustration, the steps of the method 400 will be discussed assuming both filtering and weighting have been selected as the merging methods.

At step 420, the QA application 112 begins executing a loop containing steps 430-480 for each candidate answer and each item of supporting evidence for the candidate answer. At step 430, the QA application 112 begins executing a loop containing steps 440-460 for each computed feature score for the item of evidence. At step 440, the QA application 112 determines whether the feature score exceeds the relevance threshold for that particular feature. If the feature score exceeds the threshold, the QA application 112 proceeds to step 450. Otherwise, the threshold has not been met, and the QA application 112 proceeds to step 460. For example, there may be a threshold of 50% for the feature score for evidence quality. As indicated above, an item of supporting evidence not having a quality feature score exceeding 50% may be skipped when scoring the candidate answers. At step 450, the QA application 112 may compute the weighted feature score for the item of evidence. For example, an item of evidence A may have sentiment scores of 0.45 for quality of life, 0.98 for risk of recurrence, 0.12 for disease-free survival, and an overall survival sentiment of 0.65. In an embodiment where both the quality score of 0.87 and the relevance score of 0.93 for evidence A are used to weight the sentiment features, the resulting weighted sentiment features would be 0.36 for quality of life, 0.79 for risk of recurrence, 0.09 for disease-free survival, and 0.52 for overall survival sentiment. The QA application 112 may apply the features scores in separate iterations of the loop containing steps 430-460.

At step 460, the QA application 112 determines whether more features remain. If more features remain, the QA application 112 returns to step 430. Otherwise, the QA application 112 proceeds to step 470, where it may merge the resulting scores from step 450 and returned the merged score for the candidate answer. Merging may be completed by any suitable algorithm, including taking the maximum weighted score, or an average of the values for each item of supporting evidence for the candidate answer. For example, for a given candidate answer, evidence A may have weighted feature scores of 0.36 for quality of life, 0.79 for risk of recurrence, 0.09 for disease-free survival, and 0.52 for overall survival, evidence B may have weighted feature scores of 0.11 for quality of life, 0.16 for risk of recurrence, 0.11 for disease-free survival, and 0.18 for overall survival, and evidence C may have weighted feature scores of 0.15 for quality of life, 0.13 for risk of recurrence, 0.04 for disease-free survival, and 0.01 for overall survival. If the average feature score is used for merging quality of life, disease-free survival, and overall sentiment, and the maximum feature score is used for risk of recurrence, the resulting merged sentiment features would be 0.20 for quality of life, 0.79 for risk of recurrence, 0.08 for disease-free survival, and 0.23 for overall survival of the candidate answer. Furthermore, if evidence C has a quality score of 0.32, and a quality threshold of 0.50 has been set, evidence C may not be considered when computing the merged sentiment features for the candidate answer. At step 450, the QA application 112 determines whether more candidate answers remain. If more candidate answers remain, the QA application 112 returns to step 420. Otherwise, the method 400 ends.

Advantageously, embodiments disclosed herein provide improved methods of scoring evidence and candidate answers when generating a response to a case presented to a deep question answering system. Embodiments disclosed herein aggregate a set of features for each item of supporting evidence into a single feature score, and then use that feature score to weight or filter other evidence features as they are merged into a single score for a candidate answer.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to analyze a plurality of candidate answers for a case received by a question answering system, the method comprising:

defining a first set of a plurality of features for: (i) the candidate answers, and (ii) a plurality of items of evidence, wherein defining the first set of features further specifies to merge the first set of features of the plurality of items of evidence based on a set of attributes of each feature in the first set of features;

defining a second set of the plurality of features, different than the first set of features, wherein defining the second set of features further specifies to merge the second set of features of the plurality of items of evidence based on a set of attributes of each feature in the second set of features;

computing a first feature score for the merged first set of features for each of the plurality of items of evidence for a first candidate answer of the plurality of candidate answers, wherein the first feature score is based on the set of attributes of each feature in the first set of features and each feature in the merged first set of features of the plurality of items of evidence, wherein the first feature score, the set of attributes of each feature in the first set of features, and the merged first set of features of the plurality of items of evidence are related to a first attribute of a plurality of attributes of the plurality of candidate answers and the plurality of items of evidence;

computing a second feature score for the merged second set of features for the plurality of items of evidence for the first candidate answer, wherein the second feature score is based on: (i) the set of attributes of each feature in the second set of features, (ii) the first feature score for the merged first set of features for the respective item of evidence, and (iii) each feature in the merged second set of features of the plurality of items of evidence, wherein the second feature score, the set of attributes of each feature in the second set of features, and the merged second set of features of the plurality of items of evidence are related to a second attribute of the plurality of attributes;

selecting a first merging technique, from a plurality of merging techniques, for merging the first and second feature scores; and computing a merged feature score for the first candidate answer based on the first merging technique applied to the first and second feature scores for each of the plurality of items of evidence.

2. The method of claim 1, wherein the first feature score, the second feature score, and the merged feature score are of a plurality of possible values for each respective score, wherein the plurality of merging techniques comprise: (i) weighting the merged feature score based on the first feature score, (ii) weighting the merged feature score based on the second feature score, (iii) not considering the first feature score upon determining the first feature score does not exceed a minimum weight threshold for the first feature score, (iv) considering the first feature score upon determining the first feature score exceeds the minimum weight threshold for the first feature score, (v) not considering the second feature score upon determining the second feature score does not exceed a minimum weight threshold for the second feature score, and (vi) considering the second feature score upon determining the second feature score exceed the minimum weight threshold for the second feature score, wherein computing the first feature score merges the first set of features of the plurality of items of evidence, wherein computing the second feature score merges the second set of features of the plurality of items of evidence, wherein the plurality of features comprise: (i) a quality, (ii) a relevance, (iii) a sentiment, and (iv) a source of each candidate answer and each item of evidence, wherein computing the second feature score for a first item of evidence of the plurality of items of evidence based on the first feature score of the first item of evidence comprises:

not considering the first feature score of the first item of evidence when computing the second feature score for the first item of evidence upon determining that the first feature score of the first item of evidence does not exceed the minimum weight threshold for the first feature score; and weighting the second feature score of the first item of evidence based on the first feature score of the first item of evidence upon determining that the first feature score of the first item of evidence exceeds the minimum weight threshold for the first feature score.

3. The method of claim 2, wherein the first merging technique comprises a combination of at least two of the plurality of merging techniques, the method further comprising:

computing a merged feature score of each of the plurality of candidate answers based on the first merging technique, wherein the merged feature scores of the plurality of candidate answers are used to select one of the plurality of candidate answers as a correct response to a question presented to the question answering system.

4. The method of claim 3, further comprising identifying the first feature and the second feature.

5. The method of claim 4, wherein the computing the first and second feature scores further comprises: (i) applying a machine learning model to the respective items of evidence, and (ii) computing a weighted sum of a set of values for each of the feature in the respective sets of features.

6. The method of claim 5, further comprising training the question answering system to produce the machine learning model.

7. The method of claim 1, wherein a third feature of each item of evidence is not considered in generating the merged feature score for the first candidate answer.

8. The method of claim 1, further comprising:
computing a third feature score for a third feature of each of the plurality of items of evidence, wherein each of the third feature scores are based on at least one attribute of the third feature in the respective item of evidence, wherein the second feature scores are further computed based on the third feature score of the respective item of evidence.

9. A method to analyze a plurality of candidate answers for a case received by a question answering system, the method comprising:
defining a first set of a plurality of features for: (i) the candidate answers, and (ii) a plurality of items of evidence, wherein defining the first set of features further specifies to merge the first set of features of the plurality of items of evidence based on a set of attributes of each feature in the first set of features;
defining a second set of the plurality of features, different than the first set of features, wherein defining the second set of features further specifies to merge the second set of features of the plurality of items of evidence based on a set of attributes of each feature in the second set of features;
computing a first feature score for the merged first set of features for each of the plurality of items of evidence for a first candidate answer of the plurality of candidate answers, wherein the first feature score is based on the set of attributes of each feature in the first set of features and each feature in the merged first set of features of the plurality of items of evidence, wherein the first feature score, the set of attributes of each feature in the first set of features, and the merged first set of features of the plurality of items of evidence are related to a first attribute of a plurality of attributes of the plurality of candidate answers and the plurality of items of evidence;
computing a second feature score for the merged second set of features for the plurality of items of evidence for the first candidate answer, wherein the second feature score is based on: (i) the set of attributes of each feature in the second set of features, (ii) the first feature score for the merged first set of features for the respective item of evidence, and (iii) each feature in the merged second set of features of the plurality of items of evidence, wherein the second feature score, the set of attributes of each feature in the second set of features, and the merged second set of features of the plurality of items of evidence are related to a second attribute of the plurality of attributes;
selecting a first merging technique, from a plurality of merging techniques, for merging the first and second feature scores, wherein the first merging technique comprises weighting the merged feature score based on the first and second feature scores; and
computing a merged feature score for the first candidate answer based on the first merging technique applied to the first and second feature scores for each of the plurality of items of evidence.

10. The method of claim 9, wherein the first feature score, the second feature score, and the merged feature score are of a plurality of possible values for each respective score, wherein the plurality of merging techniques further comprise: (i) weighting the merged feature score based on the first feature score, (ii) weighting the merged feature score based on the second feature score, (iii) not considering the first feature score upon determining the first feature score does not exceed a first weight threshold for the first feature score, (iv) considering the first feature score upon determining the first feature score exceeds a second weight threshold for the first feature score, different than the first weight threshold for the first feature score, (v) not considering the second feature score upon determining the second feature score does not exceed a first weight threshold for the second feature score, (vi) considering the second feature score upon determining the second feature score exceeds a second weight threshold for the second feature score, different than the first weight threshold for the first feature score, wherein the plurality of features comprise: (i) a quality, (ii) a relevance, (iii) a sentiment, and (iv) a source of each candidate answer and each item of evidence, wherein the operation further comprises prior to computing the merged feature score:
selecting a second merging technique of the plurality of merging techniques, for merging the first and second feature scores,
wherein the merged feature score for the first candidate answer is computed based on the first and second merging techniques applied to the first and second feature scores for each of the plurality of items of evidence.

* * * * *